United States Patent
Xu et al.

(10) Patent No.: US 11,258,390 B2
(45) Date of Patent: Feb. 22, 2022

(54) MOTOR DRIVE SYSTEM AND CONTROL METHOD

(71) Applicants: Wisconsin Alumni Research Foundation, Madison, WI (US); TOSHIBA MITSUBISHI-ELECTRIC INDUSTRIAL SYSTEMS CORPORATION, Chuo-ku (JP)

(72) Inventors: Yang Xu, Madison, WI (US); Chikara Morito, Tokyo (JP)

(73) Assignees: Wisconsin Alumni Research Foundation, Madison, WI (US); TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 0 days.

(21) Appl. No.: 16/879,029

(22) Filed: May 20, 2020

(65) Prior Publication Data

US 2021/0028732 A1 Jan. 28, 2021

Related U.S. Application Data

(60) Provisional application No. 62/878,343, filed on Jul. 25, 2019.

(51) Int. Cl.
| | |
|---|---|
| H02P 5/74 | (2006.01) |
| H02P 21/12 | (2016.01) |
| H02P 21/14 | (2016.01) |
| H02P 27/06 | (2006.01) |
| H02P 3/18 | (2006.01) |
| H02P 21/18 | (2016.01) |

(Continued)

(52) U.S. Cl.
CPC .............. H02P 21/12 (2013.01); H02P 3/18 (2013.01); H02P 21/141 (2013.01); H02P 21/18 (2016.02);
(Continued)

(58) Field of Classification Search
CPC ........ H02P 21/12; H02P 21/141; H02P 27/06; H02P 3/18; H02P 21/18; H02P 21/20; H02P 21/36; H02P 21/22
See application file for complete search history.

(56) References Cited

U.S. PATENT DOCUMENTS 6,121,740 A * 9/2000 Gale ..................... B60L 7/006
  318/376
9,281,772 B2 * 3/2016 Wang ...................... H02P 21/12
(Continued)

OTHER PUBLICATIONS

Wang, Y. et al., "Loss Manipulation Capabilities of Deadbeat Direct Torque and Flux Control Induction Machine Drives," IEEE Transactions on Industry Applications, vol. 51, No. 6, Nov./Dec. 2015, pp. 4554-4566.
(Continued)

*Primary Examiner* — Muhammad S Islam
(74) *Attorney, Agent, or Firm* — Oblon, McClelland, Maier & Neustadt, L.L.P.

(57) ABSTRACT

A motor drive system according to an embodiment includes an inverter and a control device. The inverter causes a current to flow through a winding of an induction motor. The control device drives the induction motor by controlling the inverter through vector control. The control device includes a plurality of calculation criteria for a stator magnetic flux estimated value of the induction motor and includes an appropriate magnetic flux command generation unit that selects a calculation criterion for the stator magnetic flux estimated value that further increases a loss of the induction motor from among the plurality of calculation criteria on the basis of at least a rotation speed of the induction motor in the case of braking the induction motor.

11 Claims, 11 Drawing Sheets

(51) Int. Cl.
*H02P 21/20* (2016.01)
*H02P 21/36* (2016.01)
*H02P 21/22* (2016.01)

(52) U.S. Cl.
CPC .............. *H02P 21/20* (2016.02); *H02P 21/22* (2016.02); *H02P 21/36* (2016.02); *H02P 27/06* (2013.01)

(56) References Cited

U.S. PATENT DOCUMENTS

2015/0200613 A1* 7/2015 Ota .......................... H02P 3/18 318/376

2015/0381092 A1* 12/2015 Wang ........................ H02P 3/18 318/400.02
2017/0036671 A1* 2/2017 Fukuchi ................ B60W 10/30

OTHER PUBLICATIONS

Hinkkanen, M. et al., "Braking Scheme for Vector-Controlled Induction Motor Drives Equipped With Diode Rectifier Without Braking Resistor," IEEE Transactions on Industry Applications, vol. 42, No. 5, Sep./Oct. 2006, pp. 1257-1263.

Jiang, J. et al., "An Efficient Braking Method for Controlled AC Drives With a Diode Rectifier Front End," IEEE Transactions on Industry Applications, vol. 37, No. 5, Sep./Oct. 2001, pp. 1299-1307.

* cited by examiner

FIG. 13

| | NOMENCLATURE |
|---|---|
| $x^s$ | Quantity in the stationary reference frame |
| $x^e$ | Quantity in the synchronous reference frame |
| $x^*$ | Command quantity |
| $\hat{x}$ | Estimated quantity or parameter |
| $x_s$ | Quantity on the stator side |
| $x_r$ | Quantity on the rotor side |
| $x_{qd} = x_q - jx_d$ | Complex vector quantity of x |
| $\dot{x}$ | Derivative of x |
| $v$ | Voltage |
| $i$ | Current |
| $\lambda$ | Flux linkage |
| $R_s, R_r$ | Stator/rotor resistance |
| $L_m, L_s, L_r$ | Magnetizing/stator/rotor inductance |
| $L_{ls}, L_{lr}$ | Stator/rotor leakage inductance |
| $\tau_r = L_r/R_r$ | Rotor time constant |
| $\sigma = 1 - L_m^2/L_s L_T$ | Leakage factor |
| $P$ | Number of poles |
| $T_e, T_L$ | Electromagnetic/load/disturbance torque |
| $V_{dc}$ | Vdc DC link voltage |
| $V_{s\,max}/I_{s\,max}$ | Maximum stator phase voltage/current |
| $\omega_e, \theta_e$ | Synchronous speed/position |
| $\omega_r, \theta_r$ | Electrical speed/position of the rotor |
| $\omega_{rm}, \theta_{rm}$ | Mechanical speed/position of the rotor |
| $\omega_{sl}$ | Slip speed |
| $p$ | differentiation |
| $P_{in}$ | Input power to DC bus |

…

MOTOR DRIVE SYSTEM AND CONTROL METHOD

This application is based upon and claims the benefit of priority from U.S. Provisional Patent Application No. 62/878,343, filed on Jul. 25, 2019; the entire contents of which are incorporated herein by reference.

BACKGROUND

Field of the Disclosure

Embodiments of the present disclosure relate to a motor drive system and a control method thereof.

Description of Related Art

A motor drive system drives an induction motor by controlling a power conversion device and brakes the induction motor in accordance with conditions.

Several technologies relating to braking an induction motor during driving are known. There is demand for braking such an induction motor more stably in a motor drive system.

U.S. Pat. No. 9,281,772 is an example of the related art.

Y. Wang, T. Ito, R. D. Lorenz, "Loss manipulation capabilities of deadbeat direct torque and flux control induction machine drives", IEEE Energy Conversion Congress and Exposition (ECCE), pp. 4554-4566, November/December 2015, M. Hinkkanen, J. Luomi, "Braking scheme for vector controlled induction motor drives equipped with diode rectifier without braking resistor", IEEE Trans. on Ind. Appl., vol. 42, no. 5, pp. 1257-1263, September/October 2006, and J. Jiang, J. Holtz, "An efficient braking method for vector controlled AC drives with a diode rectifier front end", IEEE Trans. on Ind. Appl, vol. 37, no. 5, pp. 1299-1307, September/October 2001 are examples of the related art.

SUMMARY

It is desirable to provide a motor drive system and a control method capable of more stably braking an induction motor.

A motor drive system according to an embodiment includes an inverter and a control device. The inverter causes a current to flow through a winding of an induction motor. The control device drives the induction motor by controlling the inverter through vector control. The control device includes a plurality of calculation criteria for a stator magnetic flux estimated value of the induction motor and includes an appropriate magnetic flux command generation unit that selects a calculation criterion for the stator magnetic flux estimated value that further increases a loss of the induction motor from among the plurality of calculation criteria on the basis of at least a rotation speed of the induction motor in the case of braking the induction motor.

BRIEF DESCRIPTION OF DRAWINGS

FIG. 13 is a diagram illustrating variables according to the embodiment.

DETAILED DESCRIPTION

Hereinafter, motor drive systems and control methods thereof according to embodiments will be described with reference to the drawings. The motor drive systems to be described below supply desired AC power to a motor.

First Embodiment

Figure 1:
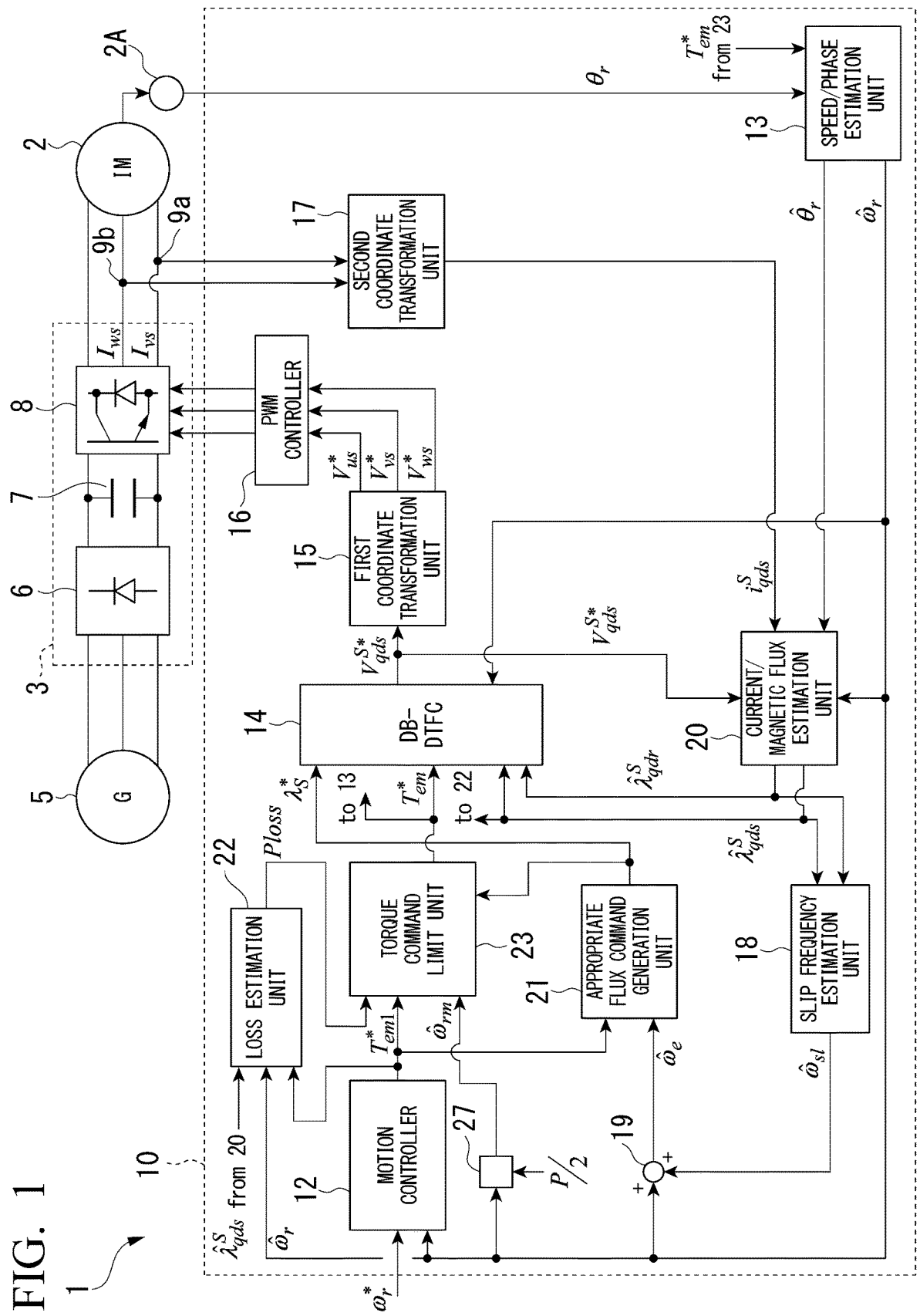
FIG. 1 is a block diagram of a motor drive system according to a first embodiment.

Next, an example of the configuration of a motor drive system 1 will be described. FIG. 1 is a block diagram illustrating the motor drive system 1 according to the embodiment.

The motor drive system 1 includes, for example, a motor 2, a power conversion device 3, a current detector 9a, a current detector 9b, and a control device 10. As illustrated in FIG. 1, the motor drive system 1 receives power from an AC power supply 5 (G). The control device 10 controlling the power conversion device 3 is applied to the motor drive system 1.

The motor 2 is, for example, a three-phase induction motor (IM). A shaft of the motor 2 is mechanically coupled to a shaft of a load which is not illustrated in the drawings. A rotor of the motor 2 is rotated by, for example, three-phase AC power supplied to a stator winding, thereby rotating the shaft of the load. A sensor 2A is disposed on the shaft of the motor 2. The sensor 2A includes, for example, a resolver, a speed sensor, and the like. The sensor 2A detects rotation of the shaft of the motor 2 and outputs information representing a physical quantity corresponding to an angle (phase) or an angular velocity of the shaft. For example, a case in which the information of a physical quantity output by the sensor 2A is a rotor electrical angle θr of the motor 2 will be described. A torque sensor is not disposed in the motor 2.

The power conversion device 3 includes, for example, a rectifier 6, a capacitor 7, and a power conversion unit 8. The rectifier 6 rectifies an alternating current supplied from the AC power supply 5 to the AC input of the rectifier 6. DC links are connected to DC outputs of the rectifier 6. The capacitor 7 is disposed on the DC links. The capacitor 7 smooths a voltage applied to the DC links.

The DC input of the power conversion unit 8 is connected to the DC links. The power conversion unit 8 converts DC power supplied through the DC links into three-phase AC power and supplies the three-phase AC power from the AC output of the power conversion unit 8 to the motor 2. The power conversion unit 8 is a voltage-type inverter. For example, the power conversion unit 8 is driven in accordance with pulse wide modulation (PWM) control from the control device 10 to be described later. The power conversion unit 8 is controlled by the control device 10 with a variable voltage variable frequency (VVVF), and adjusts the speed and the like of the motor 2.

The power conversion unit 8 includes a power conversion circuit corresponding to three phases of the AC output. The power conversion circuit includes an upper arm and a lower arm for each phase. Each of the upper arm and the lower arm includes at least one switching device.

The current detector 9a is disposed for a v-phase on the output side of the power conversion unit 8. The current detector 9a detects a v-phase stator current Ivs. The current detector 9b is disposed for a w-phase on the output side of the power conversion unit 8. The current detector 9b detects a w-phase stator current Iws. Although the current detectors 9a and 9b illustrated in the drawing are respectively disposed for these two phases, current detectors may be respectively disposed for three phases.

The control device 10 controls the power conversion device 3 on the basis of command values given by a host device and detection results acquired by the current detectors 9a and 9b.

Here, a coordinate system used by the control device 10 will be described.

The control executed by the control device 10 uses a plurality of coordinate systems, i.e., first and second coordinate systems to be appropriately selected and used in accordance with purposes. There is no limitation to using a coordinate system other than the coordinate systems illustrated here, and another coordinate system may be appropriately added, and the coordinate systems may be changed.

The first coordinate system is a three-phase coordinate system. A three-phase coordinate system includes components of three phases based on a voltage of the stator winding (stator voltage) of the motor 2. For example, the stator voltage of the motor 2 can be represented using components of three phases including a u phase, v phase, and w phase (three-phase signal components). When a stator voltage of the motor 2 is represented as a vector on a predetermined plane with respect to an origin, voltage vectors of the phases have an angular difference of $2\pi/3$ therebetween and are drawn radially from the origin (center).

The second coordinate system is a qds-axis coordinate system. A qds-axis coordinate system includes a ds axis and a qs axis that are orthogonal to each other. For example, the three-phase coordinate system and the qds-axis coordinate system may be disposed on a predetermined plane, in such a manner that, with reference to the origin of the qds-axis coordinate system, the direction of the qs axis of the qds-axis coordinate system is disposed to be aligned with the direction of a voltage vector of the u phase of the stator. An arithmetic operation of transforming three-phase signal components of the three-phase coordinate system into two-phase signal components of the ds axis and the qs axis of the qds-axis coordinate system will be referred to as "qds-axis transformation". In accordance with the "qds-axis transformation", three-phase signal components are transformed into two-phase signal components of the ds axis and the qs axis. An arithmetic operation of transforming two-phase signal components of the ds axis and the qs axis of the qds-axis coordinate system into three-phase signal components of the three-phase coordinate system will be referred to as "qds-axis inverse transformation". In accordance with the "qds-axis inverse transformation", the two-phase signal components of the ds axis and the qs axis are transformed into three-phase signal components. For example, the origin of the qds-axis coordinate system is defined on the basis of the stator magnetic flux.

As the third coordinate system, there is a synchronous qds-axis coordinate system. The synchronous qds-axis coordinate system includes a synchronous qs axis and a synchronous ds axis that are orthogonal to each other. This third coordinate system is used in a second embodiment.

As the fourth coordinate system, there is a synchronous qdr-axis coordinate system. The synchronous qdr-axis coordinate system includes a synchronous qr axis and a synchronous dr axis that rotate in synchronization with a reference signal θe for a coordinate system at rest. This fourth coordinate system is used in a third embodiment.

Variables used in the drawings and equations illustrating the embodiment will be described with reference to FIG. 13. FIG. 13 is a diagram illustrating variables according to the embodiment.

For example, an estimated value of the stator magnetic flux in the qds-axis coordinate system is denoted as a stator qds-axis magnetic flux estimated value λqds_s_est in this embodiment. Here, "λ" represents a magnetic flux. "qds" in a first part of a suffix subsequent thereto represents a qs-axis component and a ds-axis component of the qds-axis coordinates. "s" in a second part of the suffix represents a stationary coordinate system at the stator side (hereinafter, referred to as a stator-side coordinate system). A stator qds-axis magnetic flux λqds_s collectively represents two-phase components of the qds-axis coordinates. In the above case, the two-phase components include two components, i.e., a stator qs-axis magnetic flux λqs_s and a stator ds-axis magnetic flux λds_s. The stator qs-axis magnetic flux λqs_s represents a qs-axis component in the qds-axis coordinate system of the stator magnetic flux. The stator ds-axis magnetic flux λds_s represents a ds-axis component in the qds-axis coordinate system of the stator magnetic flux. In some cases, information represented by two-phase components may be collectively handled as a vector value in a complex vector space. "est" of a third part of the suffix represents an estimated value. Information used for identifying chronological order information is written within parentheses following the third part. There are a command value (com), a differential value (dot), a detection value (det), an average value (ave), and the like in addition to those described above that are represented in the third part.

In the following calculation equations and drawings, denotations different from denotations used in this description may be used. For example, the stator qds-axis magnetic flux estimated value λqds_s_est may be represented as in Equation (1).

$$\hat{\lambda}_{qds}^{s} \tag{1}$$

A subscript "qds" of "λ" shown in Equation (1) illustrated above represents information of a two-phase component of the qds-axis coordinates. A superscript "s" of "λ" represents information of the stator-side coordinate system. Furthermore, "^" above "λ" represents an estimated value. Other than above, symbols above a character include "." representing a differential value. A command value is represented using "*" in a superscript. Variables representing complex vectors include the flux magnetic flux λ described above, a voltage V, and a current i. For details of others, please refer to FIG. 13.

Referring back to FIG. 1, the control device 10 will be described.

The control device 10 includes, for example, a motion controller 12, a speed/phase estimation unit 13, a DB-DTFC calculation unit 14, a first coordinate transformation unit 15, a PWM controller 16, a second coordinate transformation unit 17, a slip frequency estimation unit 18, an adder unit 19, a current/magnetic flux estimation unit 20, an appropriate flux command generation unit 21, a loss estimation unit 22, a torque command limit unit 23, and a divider unit 27.

The motion controller 12 calculates an air gap torque command value Tem1_com on the basis of a rotor angular velocity command value (electrical speed) ωr_com and an rotor angular velocity estimated value (electrical speed) ωr_est. For example, the rotor angular velocity command value (electrical speed) ωr_com may be supplied from a device (a host device) external to the control device 10. The rotor angular velocity estimated value (electrical speed) ωr_est is supplied from the speed/phase estimation unit 13 to be described later. Hereinafter, the rotor angular velocity estimated value (electrical speed) ωr_est will be simply referred to as an rotor angular velocity estimated value ωr_est. The motion controller 12 calculates an air gap torque command value Tem1_com such that the rotor angular velocity estimated value ωr_est is caused to follow the rotor angular velocity command value (electrical speed) ωr_com. The air gap torque command value Tem1_com may have an amplitude of the signal being limited in accordance with passing through the torque command limit unit 23 to be described later. In accordance with this, the air gap torque command value Tem_com for the DB-DTFC calculation unit 14 may be transformed into a value different from the air gap torque command value Tem1_com.

The a speed/phase estimation unit 13 calculates the rotor angular velocity estimated value ωr_est and the rotor angle estimated value (electrical position) θr_est, for example, on the basis of the rotor electrical angle θr supplied from the sensor 2A. For example, the rotor angle estimated value (electrical position) θr_est may be an average value of the rotor electrical angle θr. Hereinafter, the rotor angle estimated value (electrical position) θr_est will be simply referred to as a rotor angle estimated value θr_est.

For example, the speed/phase estimation unit 13 includes a motion observer that estimates a rotation state of the motor 2. The motion observer is equivalent to a zero lag filter and decreases a lag of an output signal with respect to an input signal such that the lag becomes less than a lag of a generally-used first-order lag filter. In other words, the speed/phase estimation unit 13 decreases lags of the rotor angular velocity estimated value ωr_est and the rotor angle estimated value θr_est with respect to the rotor electrical angle θr. The rotor angular velocity estimated value ωr_est and the rotor angle estimated value θr_est respectively serve as estimated values of current state quantities. The speed/phase estimation unit 13 enables acquisition of output signals including small noise components by using such a motion observer.

For example, the speed/phase estimation unit 13 supplies the rotor angular velocity estimated value ωr_est to the motion controller 12, the DB-DTFC calculation unit 14, the adder unit 19, the current/magnetic flux estimation unit 20, the loss estimation unit 22, and the divider unit 27. The rotor angular velocity estimated value (mechanical speed) ωrm_est transformed by the divider unit 27 is supplied to the torque command limit unit 23. The speed/phase estimation unit 13 supplies the rotor angle estimated value θr_est to the current/magnetic flux estimation unit 20.

It should be noted that any one of a phase and an angular velocity may be input to the motion observer described above. For example, when a phase sensor is used as the sensor 2A, an input signal supplied to the speed/phase estimation unit 13 may be a phase θr, and, when a speed sensor is used as the sensor 2A, an input signal supplied to the speed/phase estimation unit 13 may be an angular velocity ωr. A pulse generator (PLG) is an example of a speed sensor.

When a physical sensor such as the sensor 2A is not used, a position tracking observer may be used as the speed/phase estimation unit 13. In such a case, as an input signal input to the position tracking observer, any one of a current, a voltage, and a magnetic flux may be used. For an example of the configuration of the position tracking observer, refer to Yang Xu et al., "Extending Low Speed Self-Sensing via Flux Tracking with Volt-Second Sensing", [online], 2018, IEEE, [retrieved on Sep. 13, 2018], Internet (URL: https://ieeexplore.ieee.org/document/8344841) and the like.

The DB-DTFC calculation unit 14 (illustrated as DB-DTFC in the drawing) is a controller that controls the motor 2 in accordance with a deadbeat-direct torque and flux control (DB-DTFC) system. A physical model of the motor 2 is set in the DB-DTFC calculation unit 14 in advance. The physical model is acquired by replacing the motor 2 with an equivalent electric circuit and forming it into a mathematical expression. The DB-DTFC calculation unit 14 calculates a drive quantity command value defining the drive quantity of the motor 2 on the basis of at least a torque command for the motor 2, an estimated value of the stator magnetic flux of the motor 2, and a reference value of the stator magnetic flux of the motor 2 by using the physical model.

For example, the DB-DTFC calculation unit 14 has an air gap torque command value Tem_com, a stator qds-axis magnetic flux estimated value λqds_s_est, a rotor qds-axis magnetic flux estimated value λqdr_s_est, a stator magnetic flux command value λs_com, and a stator angular velocity estimated value ωr_est to be included as input variables and calculates a stator qds-axis voltage command value Vqds_s_com using the DB-DTFC based on the input variables described above. The air gap torque command value Tem_com is supplied from the torque command limit unit 23. The stator qds-axis magnetic flux estimated value λqds_s_est and the rotor qds-axis magnetic flux estimated value λqdr_s_est are supplied from the current/magnetic flux estimation unit 20 to be described later. The stator magnetic flux command value λs_com, for example, is supplied from the appropriate flux command generation unit 21. The stator angular velocity estimated value ωr_est is supplied from the speed/phase estimation unit 13. The air gap torque command value Tem_com is an example of a torque command for the motor 2. The stator magnetic flux command value λs_com is an example of a reference value of stator magnetic flux of the motor 2. The air gap torque command value Tem_com, for example, is acquired at a predetermined phase within a control cycle.

The DB-DTFC calculation unit 14 calculates a stator qds-axis voltage command value Vqds_s_com using the values of the input variables described above. The DB-DTFC calculation unit 14 outputs the calculated stator qds-axis voltage command value Vqds_s_com to the first coordinate transformation unit 15 and the current/magnetic flux estimation unit 20. The DB-DTFC calculation unit 14 controls the power conversion device 3 on the basis of the stator qds-axis voltage command value Vqds_s_com.

The first coordinate transformation unit 15 transforms the stator qds-axis voltage command value Vqds_s_com that is a voltage command value in the qds-axis coordinate system into three-phase stator voltage command values Vus_s_com, Vvs_s_com, and Vws_s_com that are voltage command values in the three-phase stator coordinate system (stationary coordinate system). The transformation executed by the first coordinate transformation unit 15 is a "qds-axis inverse transformation".

The PWM controller 16 outputs a control signal based on a drive quantity command value defining a drive quantity of the motor 2 to the power conversion device 3 that drives the motor 2. The PWM controller 16 compares, for example, the three-phase stator voltage command values Vus_s_com, Vvs_s_com, and Vws_s_com transformed by the first coordinate transformation unit 15 with a carrier signal and generates gate pulses GP for the power conversion unit 8 using pulse width modulation (PWM). The PWM controller 16 illustrated in FIG. 1 outputs a gate pulse GP corresponding to each switching device of the power conversion unit 8 to the switching device.

The second coordinate transformation unit 17 transforms stator currents Ivs and Iws supplied from the current detectors 9a and 9b into a stator qds-axis current detection value Iqds_s_det in the qds-axis coordinate system. The transformation executed by the second coordinate transformation unit 17 is a "qds-axis transformation".

The qds-axis transformation is executed, for example, using the following equation. A stator current Ius is calculated on the basis of the stator currents Ivs and Iws. A relationship between three-phase stator currents Ius, Ivs, and Iws and stator currents Iqs_s and Ids_s, which are obtained by the two-phase transformation, is represented in the following Equation (2). The transformation represented in the following Equation (2) is different from a generally-used Clarke transformation. Please note that the qds-axis inverse transformation is an inversion of the transformation represented in Equation (2).

$$Ius+Ivs+Iws=0$$

$$I_{qs}^{s}=Ius$$

$$I_{ds}^{s}=(Ius+2Iws)/\sqrt{3} \quad (2)$$

The slip frequency estimation unit 18 calculates a slip angle frequency estimated value ωs1_est relating to a slip of the motor 2. The slip frequency estimation unit 18, for example, calculates a torque estimated value Te_est on the basis of an amplitude value of the rotor qds-axis magnetic flux estimated value λqdr_s_est and an amplitude value of the stator qds-axis magnetic flux estimated value λqds_s_est calculated by the current/magnetic flux estimation unit 20 and calculates a slip angle frequency estimated value ωs1_est using an amplitude value of the torque estimated value Te_est and an amplitude value of the rotor qds-axis magnetic flux estimated value λqdr_s_est. Alternatively, the slip frequency estimation unit 18 may calculate the slip angle frequency estimated value ωs1_est using a commonly-used silp angle frequency estimating/calculating method. The slip angle frequency may be referred to as a slide angular velocity or a slip speed.

The adder unit 19 calculates a synchronous angular velocity ωe_est (hereinafter, simply referred to as a synchronous angular velocity we) of the motor 2 by adding the slip angle frequency estimated value ωs1_est calculated by the slip frequency estimation unit 18 to the rotor angular velocity estimated value ωr_est.

The current/magnetic flux estimation unit 20 is an observer that estimates an operating state of the motor 2 on the basis of several input variables and calculates a stator qds-axis magnetic flux estimated value λqds_s_est and a rotor qds-axis magnetic flux estimated value λqdr_s_est. For example, in the input variables described above, the stator qds-axis voltage command value Vqds_s_com, the stator qds-axis current detection value Iqds_s_det transformed by the second coordinate transformation unit 17, the rotor angular velocity estimated value ωr_est, and the rotor angle estimated value θr_est are included.

The divider unit 27 calculates an rotor angular velocity estimated value (mechanical speed) ωrm_est by dividing the rotor angular velocity estimated value ωr_est calculated by the speed/phase estimation unit 13 by (P/2) that is the number of pole pairs. P in a capital letter is the number of poles.

Figure 2:
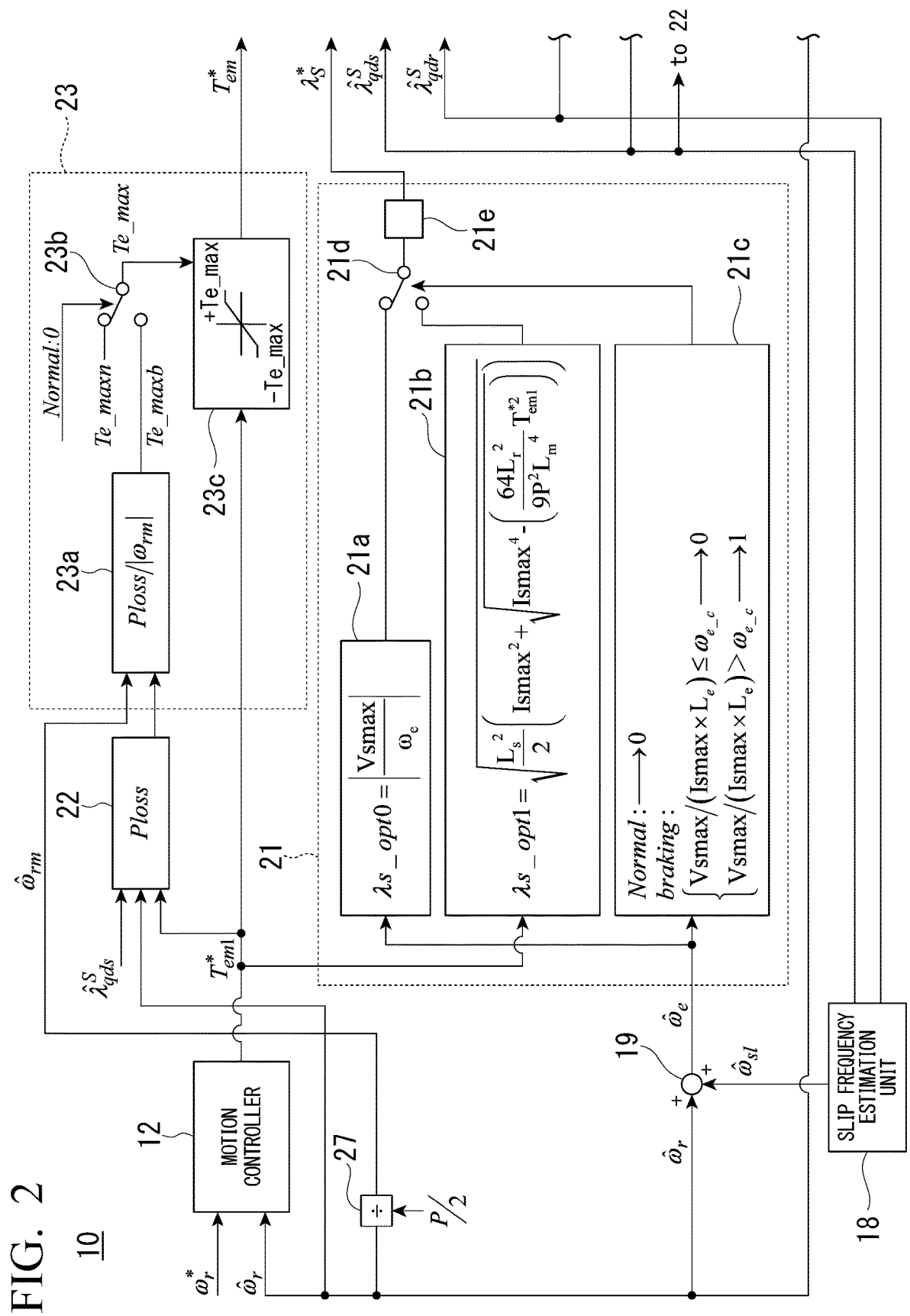
FIG. 2 is a configuration diagram in which a part of a control device according to the first embodiment is enlarged.

The torque command value Tem1_com calculated by the motion controller 12 and the synchronous angular velocity ωe calculated by the adder unit 19 and, additionally, a brake preparation flag Fg1 and a brake start flag Fg2 not illustrated in FIG. 2 are input to the appropriate flux command generation unit 21. The appropriate flux command generation unit 21 calculates a stator magnetic flux command value λs_com on the basis of the torque command value Tem1_com, the synchronous angular velocity ωe, the brake preparation flag Fg1, and the brake start flag Fg2 and outputs the stator magnetic flux command value λs_com to the DB-DTFC calculation unit 14. Here, the stator magnetic flux command value λs_com output from the appropriate flux command generation unit 21 is a scalar quantity. Details thereof will be described later.

The loss estimation unit 22 calculates a loss Ploss of the motor 2 using the physical model of the motor 2 and supplies a value of the loss Ploss to the torque command limit unit 23.

The torque command value Tem1_com calculated by the motion controller 12, the loss Ploss, and the rotor angular velocity estimated value (mechanical speed) ωrm_est and, additionally, the brake preparation flag Fg1 and the brake start flag Fg2 are input to the torque command limit unit 23. The torque command limit unit 23, for example, switches a limit value Te_max to one of a value Te_maxn used at the time of normal driving and a value Te_maxb used at the time of braking on the basis of the brake preparation flag Fg1 and the brake start flag Fg2, the loss Ploss, and the rotor angular velocity estimated value (mechanical speed) ωrm_est. The torque command limit unit 23 outputs the torque command value Tem_com to the speed/phase estimation unit 13 and the DB-DTFC calculation unit 14.

For more details of the DB-DTFC calculation unit 14 and the current/magnetic flux estimation unit 20, refer to U.S. Patent Application Publication No. 2020/0007858 and the like.

For example, the control device 10 receives a deceleration start command from a host device not illustrated in the drawings, sets the brake preparation flag Fg1, and changes the stator magnetic flux command value λs_com to a value for which the loss becomes a maximum. When the stator qds-axis magnetic flux estimated value λqds_s_est reaches a value for which the loss becomes a maximum, the control device 10 sets the brake start flag Fg2, switches from speed control to torque control, and applies brake.

Next, a more detailed example of the control device 10 according to the embodiment will be described.

FIG. 2 is a configuration diagram in which a part of the control device 10 according to the first embodiment is enlarged. The appropriate flux command generation unit 21, the loss estimation unit 22, and the torque command limit unit 23 will be focused on in description.

The loss estimation unit 22, for example, calculates a loss Ploss of the motor 2 in accordance with the following Equation (3).

$$Ploss = \left( \frac{8}{3P^2} \frac{R_r L_s^2}{L_m^2} + \frac{8}{3P^2} \frac{R_s L_s^2 L_r^2}{L_m^4} + \frac{K_e}{2\pi^2} \frac{16}{9P^2} \frac{R_r^2 L_s^4}{L_m^4} \right) \frac{T_{em1}^2}{|\lambda_{qds}|^2} + \qquad (3)$$
$$\left( \frac{K_e}{4\pi^2} \omega_r^2 + \frac{K_h}{2\pi} \omega_r + \frac{3}{2} \frac{R_s}{L_s^2} \right) |\lambda_{qds}|^2 + \left( \frac{K_e}{2\pi^2} \omega_r + \frac{K_h}{\pi} \right) \frac{4}{3P} T_{em1} R_r \frac{L_s^2}{L_m^2}$$

In Equation (3), Ke, Kb, and Kh are coefficients of which values are set in advance. The values of Rr, Lr, Rs, Ls, and LM are defined in accordance with the characteristics of the motor 2. For details of this Equation (3), refer to the following document.

Y. Wang, T. Ito, R. D. Lorenz, "Loss manipulation capabilities of deadbeat direct torque and flux control induction machine drives", IEEE Energy Conversion Congress and Exposition (ECCE), pp. 4554-4566, November/December 2015.

The torque command limit unit 23 includes a first block 23a, a second block 23b, and a third block 23c.

The first block 23a calculates an upper limit torque command value Te_maxb on the basis of the loss Ploss and the rotor speed estimated value ωrm_est using Equation (4) to be described later. Equation (4) is a calculation equation for calculating an upper limit torque command value corresponding to the loss Ploss and the rotor speed estimated value ωrm_est.

$$T_{e\_maxb} = P\text{loss}/|\hat{\omega}_{rm}| \qquad (4)$$

The second block 23h determines an upper limit torque command value Te_max in accordance with a drive command from a host device. For example, a value of a drive command indicates that the drive command from the host device is drive or stop using "0" (normal) and indicates that the drive command is brake using "1" (braking). The drive command described above may be associated with one of the brake preparation flag Fg1 and the brake start flag Fg2. The second block 23b selects a normal-time upper limit torque command value Te_maxn in a case in which the value of the drive command is "0" (normal) and selects an upper limit torque command value Te_maxb output by the first block 23a in a case in which the value of the drive command is "1" (braking) The second block 23b transmits the selected result to the third block 23c as an upper limit torque command value Te_max.

The third block 23c determines an allowed torque range using the upper-limit torque command value Te_max transmitted from the second block 23h. The allowed torque range is a range from a lower-limit limiter torque value (−Te_max) to an upper-limit limiter torque value (+Te_max). The upper limit torque command value Te_max is applied to the upper-limit limiter torque value. The lower-limit limiter torque value is a value acquired by applying a negative coefficient of "−1" to the upper-limit limiter torque value. This negative coefficient is a value set in advance and may have a value other than "−1". The lower-limit limiter torque value may be set to zero by multiplying the upper-limit limiter torque value by zero instead of this negative coefficient.

For example, when a first torque command value Tem1_com is within the allowed torque range, the third block 23c substitutes a second torque command value Tem_com with the value of the first torque command value Tem1_com as it is. In a case in which the first torque command value Tem1_com is larger than the upper-limit limiter torque value (+Te_max), the third block 23c substitutes the second torque command value Tem_com with the upper-limit limiter torque value (+Te_max). In a case in which the first torque command value Tem1_com is smaller than the lower-limit limiter torque value (−Te_max), the third block 23c substitutes the second torque command value Tem_com with the lower-limit limiter torque value (−Te_max).

In other words, the third block 23c achieves the function of a filter that passes only a torque command value that is within the allowed torque range. In accordance with this, the third block 23c can generate a second torque command value Tem_com. The second torque command value Tem_com is a value acquired by modifying the first torque command value Tem1_com1 such that it becomes limited to within an allowed torque range set in advance.

The appropriate flux command generation unit 21 includes a first block 21a, a second block 21b, a third block 21c, a fourth block 21d, and a fifth block 21e. The appropriate flux command generation unit 21 generates a stator magnetic flux command value λs_com corresponding to the synchronous angular velocity ωe or the first torque command value Tem1_com.

The first block 21a calculates a stator magnetic flux command value λs_opt0 in accordance with the following Equation (5). The first block 21a calculates an absolute value of a value acquired by dividing a limit value Vsmax of the stator voltage Vs (hereinafter, referred to as a limit value Vsmax of the voltage) by the synchronous angular velocity ωe and outputs a result of the calculation as the stator magnetic flux command value λs_opt0.

$$\lambda s\_opt0 = \left| \frac{Vsmax}{\omega_e} \right| \qquad (5)$$

The second block 21h calculates a stator magnetic flux command value λs_opt1 in accordance with the following Equation (6).

$$\lambda s\_opt1 = \sqrt{\frac{L_s^2}{2} \left( Ismax^2 + \sqrt{Ismax^4 - \left( \frac{64L_r^2}{9P^2 L_m^4} T_{em1}^{*2} \right)} \right)} \qquad (6)$$

The third block 21c determines a logical value of a selection signal for determining the stator magnetic flux command value λs_opt on the basis of the synchronous angular velocity ωe and the synchronous angular velocity threshold ωe_c in accordance with the following Equation (7). For example, the logical value of the selection signal becomes "1" in a case in which a drive command from a host device is drive or stop (normal), and "0" or "1" is selected in accordance with a result of calculation using the synchronous angular velocity ωe and the synchronous angular velocity threshold ωe_c in a case in which the drive command is brake. For example, the third block 21c selects "1" in a case in which the synchronous angular velocity ωe is higher than the synchronous angular velocity threshold ωe_c and selects "0" in a case in which the synchronous angular velocity ωe is lower than or equal to the synchronous angular velocity threshold ωe_c.

$$\text{Normal:} \to 1 \qquad (7)$$
$$\text{braking:}$$
$$\begin{cases} \omega_e \leq \omega_{e\_c} \to 0 \\ \omega_e > \omega_{e\_c} \to 1 \end{cases}$$

The synchronous angular velocity threshold ωe_c in Equation (7) described above may be defined as represented in the following Equation (8) using the limit value Vsmax of the voltage, a limit value Ismax of the current, and an inductance Le.

$$Vs\,\max = Vdc/\sqrt{3}$$
$$Is\,\max = Irate \times \sqrt{2}$$
$$\omega_{e\_c} = Vs\,\max/(Is\,\max \times L_e) \qquad (8)$$

Irate represented in Equation (8) is a rated current value of a DC link.

The fourth block 21d selects the stator magnetic flux command value λs_opt0 output from the first block 21a in a case in which the logical value of the selection signal is "0" and selects the stator magnetic flux command value λs_opt1 output from the second block 23b in a case in which the logical value of the selection signal is "1". The second block 23b outputs the selected result as the stator magnetic flux command value λs_opt.

The fifth block 21e is a low pass filter that passes components of a frequency band lower than a predetermined frequency and outputs a stator magnetic flux command value λs_com of which a step change is inhibited by limiting the band of a signal of the stator magnetic flux command value λs_opt output by the fourth block 21d.

Next, braking control according to an embodiment will be described.

In a case in which there is no active front end that can regenerate electric power into a system (for example, a converter that can regenerate electric power), electric power injected to the DC link section cannot be regenerated into a system. In addition, in a case in which there is no braking resistance consuming excessive electric power of the DC link section, it is difficult to reduce a voltage of the DC links.

In the case as described above, the amount of input power (Pin) for the DC link section can be defined as represented in the following Equation (9). A braking torque of the motor 2 will be represented using Te_braking. The amount of input power (Pin) has a value acquired by adding a loss Ploss to a product of the braking torque Te_braking and the rotor speed ωrm. The amount of input power (Pin) during braking is larger than zero.

$$P_{in} = T_{e\_braking} \times \omega_{rm} + Ploss \geq 0 \qquad (9)$$

As a result, by using the following Equation (10), a maximum braking torque is acquired. The maximum braking torque is a maximum value of the absolute value of the braking torque Te_braking. The maximum value of the absolute value of the braking torque Te_braking is a result acquired by dividing the loss Ploss by the rotor speed estimated value ωrm_est.

$$|T_{e\_braking}|_{max} = Ploss/|\hat{\omega}_{rm}| \qquad (10)$$

In many cases, the loss of the power conversion unit 8 is smaller than the loss Ploss of the motor 2. In this Equation (10), the loss of the power conversion unit 8 is omitted for approximation.

As represented in Equation (10) described above, a limit value relating to the braking torque of the motor 2 can be defined on the basis of the loss Ploss of the motor 2 and the rotor speed ωrm. The limit value dynamically changes. In order to brake the motor 2 more quickly, the stator magnetic flux λs_com may be controlled such that it increases the loss Ploss of the motor 2 using limits value of voltages and limit values of currents of the motor 2 and the power conversion unit 8.

In addition to dynamically setting the limit value of the braking torque Te_braking in accordance with the loss Ploss of the motor 2, there are cases in which the braking torque Te_braking is limited in accordance with the limit values of the voltages and the limit values of the currents described above.

A rough value of the limit value of the braking torque Te_braking set using the loss of a general induction motor and the limit values of the voltages and the limit values of the currents has been investigated. In the case of a general induction motor, the loss of the motor is smaller than 15% of the loss of the rated electric power.

For this reason, the limit value (maximum value) of the braking torque Te_braking limited using Equation (10) is smaller than 0.2 [pu] that is a torque at the time of a rated speed and is smaller than 0.4 [pu] that is a torque at a half speed of the rated speed value. On the other hand, a limit value (maximum value) of the braking torque Te_braking limited in accordance with the limit values of the voltages and the limit values of the currents described above is at least 1 [pu]. From such a result, a torque limit value smaller than the limit value of the braking torque Te_braking based on the limit values of the voltages and the limit values of the currents described above is determined using Equation (10).

(Physical Model)

Next, a physical model (analysis model) of the motor 2 for faster braking using the DB-DTFC will be described. For example, the physical model of the motor 2 will be defined using Equation (3) described above. An estimated value of a motor loss (loss Ploss) in an initial state of braking control is calculated using Equation (3) described above.

The first torque command value Tem1_com output from the motion controller 12 is limited in accordance with Equation (10). The stator magnetic flux command value λs_com is selected in association with the rotor speed estimated value ωrm_est and the torque command value using the limit values of the voltages and the limit values of the currents described above. For example, the limit value Vsmax of the voltage described above is represented in Equation (11).

$$(\lambda_{qs}^e)^2 + (\lambda_{ds}^e)^2 \leq \frac{Vsmax^2}{\omega_e^2} \qquad (11)$$

The limit value Ismax of the current described above is represented in Equation (12).

$$\left(\frac{\lambda_{qs}^e}{\sigma L_s}\right)^2 + \left(\frac{\lambda_{ds}^e}{L_s}\right)^2 \leq Ismax^2 \qquad (12)$$

Figure 3:
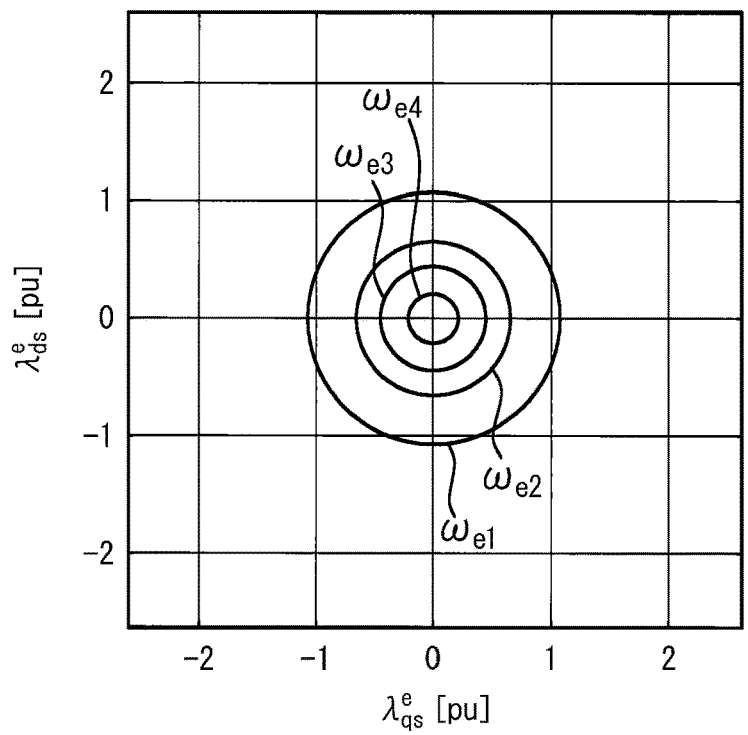
FIG. 3 is a diagram illustrating a limit value Vsmax of a voltage in a qds-axis coordinate system of magnetic flux according to the first embodiment.

A relation between the limit value Vsmax of the voltage and the limit value Ismax of the current in the qds-axis coordinate system of magnetic flux will be described with reference to FIGS. 3 to 5. FIG. 3 is a diagram illustrating the limit value Vsmax of the voltage in the qds-axis coordinate system of magnetic flux. As denoted by a solid line in FIG. 3, the limit value Vsmax of the voltage becomes a circle having the origin of coordinate axes in the qds-axis coordinate system of magnetic flux as a reference. A radius of this circle relates to a synchronous angular velocity ωe. From the relation represented in Equation (11) described above, when the magnitude of the limit value Vsmax of the voltage is not changeable, the radius of the circle decreases as the synchronous angular velocity ωe becomes higher. In this FIG. 3, for example, a case in which the synchronous angular velocity ωe is changed in four levels will be described as an example. The synchronous angular velocity ωe is higher in order of ωe1, ωe2, ωe3, and ωe4.

Figure 4:
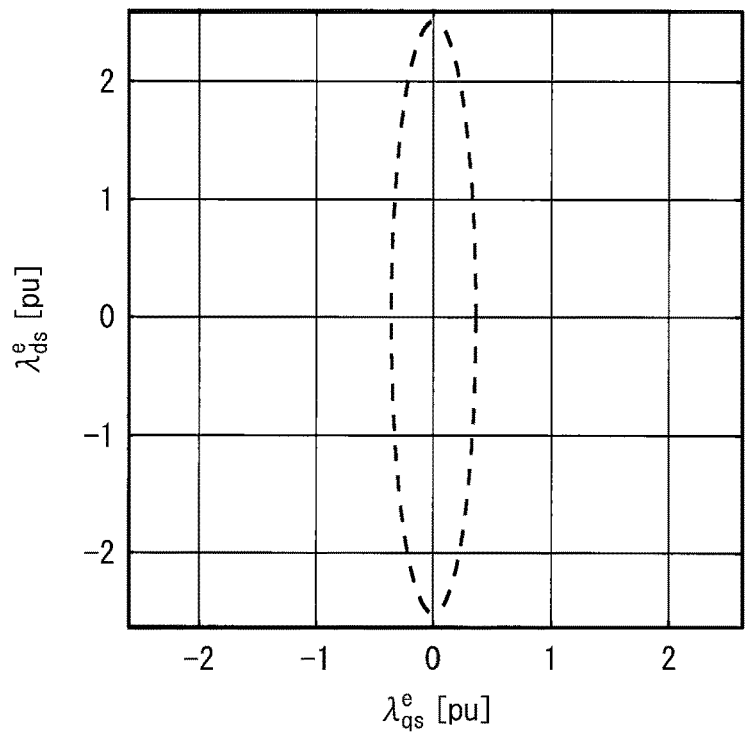
FIG. 4 is a diagram illustrating a limit value Ismax of a current in the qds-axis coordinate system of magnetic flux according to the first embodiment.

FIG. 4 is a diagram illustrating the limit value Ismax of the current in the qds-axis coordinate system of magnetic flux. As denoted by a broken line in FIG. 4, the limit value Ismax of the current becomes an oval having the origin of coordinate axes in the qds-axis coordinate system of the magnetic flux as a reference. From the relation represented in Equation (12) described above, the oval does not relate to the magnitude of the synchronous angular velocity ωe. The circumference of this oval will be referred to as a current oval, and an area inside the current oval will be referred to as a current oval area.

Figure 5:
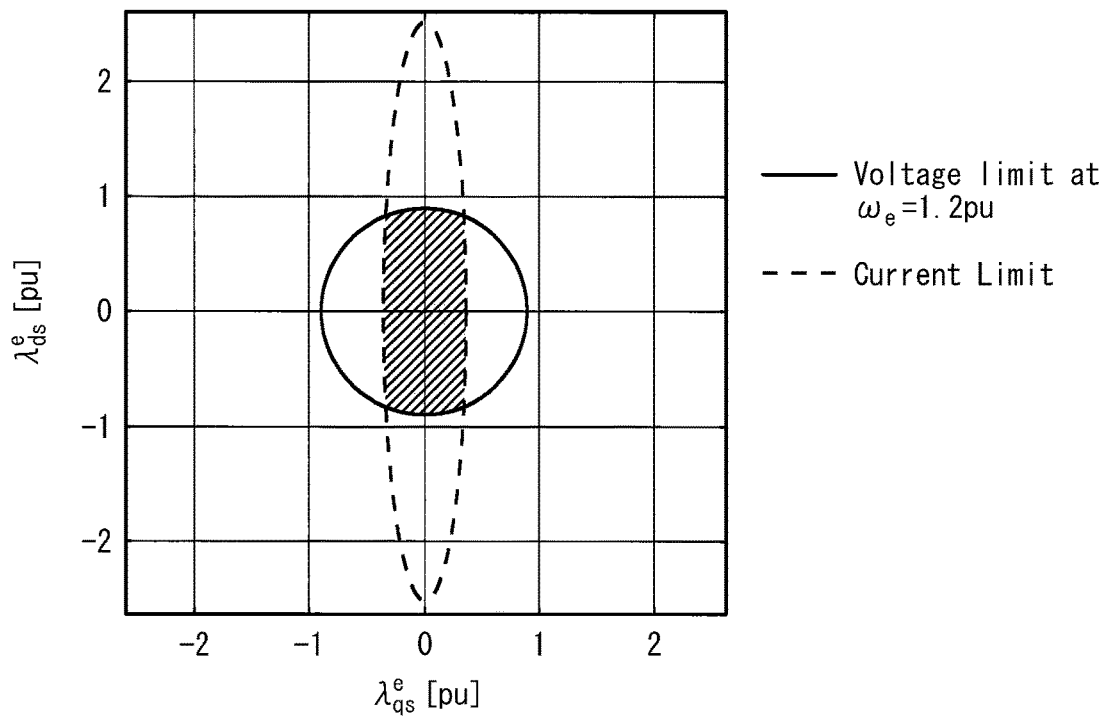
FIG. 5 is a diagram illustrating a relation between the limit value Vsmax of the voltage and the limit value Ismax of the current in the qds-axis coordinate system of magnetic flux according to the first embodiment.

FIG. 5 illustrates a relation between the limit value Vsmax of the voltage and the limit value Ismax of the current. FIG. 5 is a diagram illustrating a relation between the limit value Vsmax of the voltage and the limit value Ismax of the current in the qds-axis coordinate system of magnetic flux. In the qds-axis coordinate system of magnetic flux illustrated in FIG. 5, the circle (the solid line) illustrated in FIG. 3 described above and the oval (a broken line) illustrated in FIG. 4 described above are disposed to overlap each other using the origin of the coordinate axes as a reference. An area enclosed by the circle and the oval represents an area that can be used for control. The limit value Vsmax of the voltage represented here is a value when the synchronous angular velocity ωe is 1.2 [pu]. In a first quadrant of the qds-axis coordinate system of the magnetic flux, a limit area according to a weak magnetic flux area not illustrated in the drawing is defined. In the weak magnetic flux area, it should be noted that the value of the vertical axis of the voltage circle is limited to 1 [pu] for avoiding saturation of iron. However, this does not relate to operations during braking.

For describing an execution method more simply, the entire speed range of the motor 2 will be divided into two areas, for example, including speed area I and speed area II in accordance with the magnitude of the speed, and each of the areas will be described. For example, the speed area I and the speed area II may be divided using the synchronous angular velocity threshold ωe_c described above.

Figure 6:
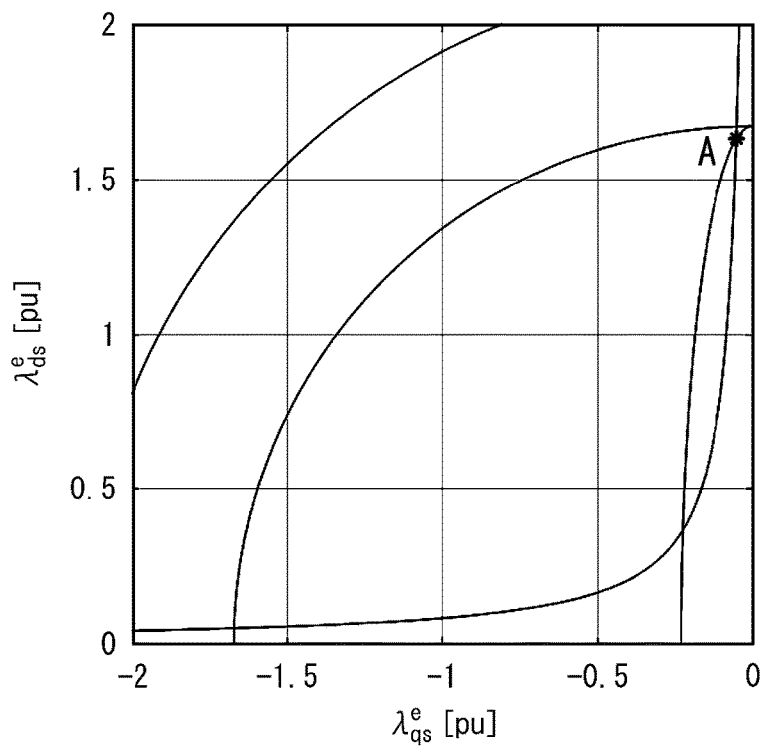
FIG. 6 is a diagram illustrating brake control from a relatively low-speed state according to the first embodiment.

The speed area I corresponds to a case in which the synchronous angular velocity ωe is relatively low with respect to the synchronous angular velocity threshold we. FIG. 6 is a diagram illustrating braking control of a motor 2 rotating at a relatively low speed. As illustrated in FIG. 6, in the case of a relatively low-speed state, a current oval area is positioned inside a voltage circle. In order to acquire a maximum loss Ploss (hereinafter, referred to as a maximum loss), the value of the stator magnetic flux λqds_s and the value of the stator current Iqds_s are increased as much as possible. Even when the value of the stator magnetic flux λqds_s and the value of the stator current Iqds_s increase as much as possible, they are limited by the current oval. As a result, for example, when an intersection between a torque curve and the current oval is denoted by a point A, the intersection (the point A) becomes an operating point at which the maximum loss and a maximum torque are satisfied. The magnitude of the stator magnetic flux command λs_com relating to this operating point is calculated from the following Equation (13).

$$|\lambda s\_com| = \sqrt{\frac{L_s^2}{2}\left(Ismax^2 + \sqrt{Ismax^4 - \left(\frac{64L_r^2}{9P^2L_m^4}T_{em1}^{*2}\right)}\right)} \quad (13)$$

When being in a relatively low-speed state, the magnitude of the stator magnetic flux command λs_com represented in Equation (13) becomes a function having the torque command value Tem1_com as a variable, does not depend on the magnitude of the synchronous angular velocity ωe, and has an independent relation from the synchronous angular velocity ωe. Even when the stator current Iqds_s reaches its limit value Ismax, the voltage Vs_com becomes a value smaller than its maximum value set in accordance with the voltage circle.

Figure 7:
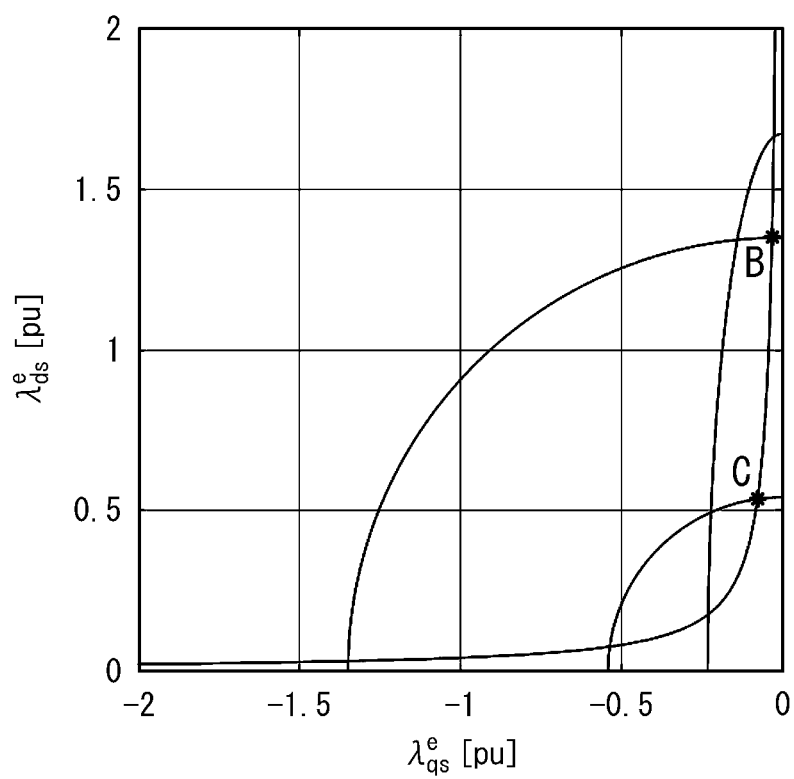
FIG. 7 is a diagram illustrating brake control from a relatively high-speed state according to the first embodiment.

On the other hand, the speed area IT corresponds to a case in which the synchronous angular velocity ωe is a relatively high velocity with respect to the synchronous angular velocity threshold ωe_c. FIG. 7 is a diagram illustrating braking control of a motor 2 that rotates at a relatively high speed. As illustrated in FIG. 7, in the case of a relatively high-speed state, a part of a current oval area comes out from a voltage circle and is not positioned inside the voltage circle. In accordance with Equation (3) relating to the loss Ploss described above, it is represented that a maximum loss is reached at one of a lower limit value and an upper-limit value that are limit values of the stator magnetic flux λqds_s. In the speed area II (a high-speed area), an iron loss contributes to the acquisition of higher stator magnetic flux λqds_s.

As a result, when an intersection between the torque curve and the voltage circle, for example, is denoted by a point B or a point C, the intersection is selected as an operating point satisfying a maximum loss and a maximum braking torque. The magnitude of the stator magnetic flux command λs_com is calculated from the following Equation (14).

$$|\lambda s\_com| = \left|\frac{Vsmax}{\omega_e}\right| \quad (14)$$

When being in a relatively high-speed state, the stator magnetic flux command λs_com represented in Equation (14) becomes a function of the speed. Even when the voltage Vs reaches its limit value Vsmax, the current Is has a value smaller than its maximum value.

Figure 8:
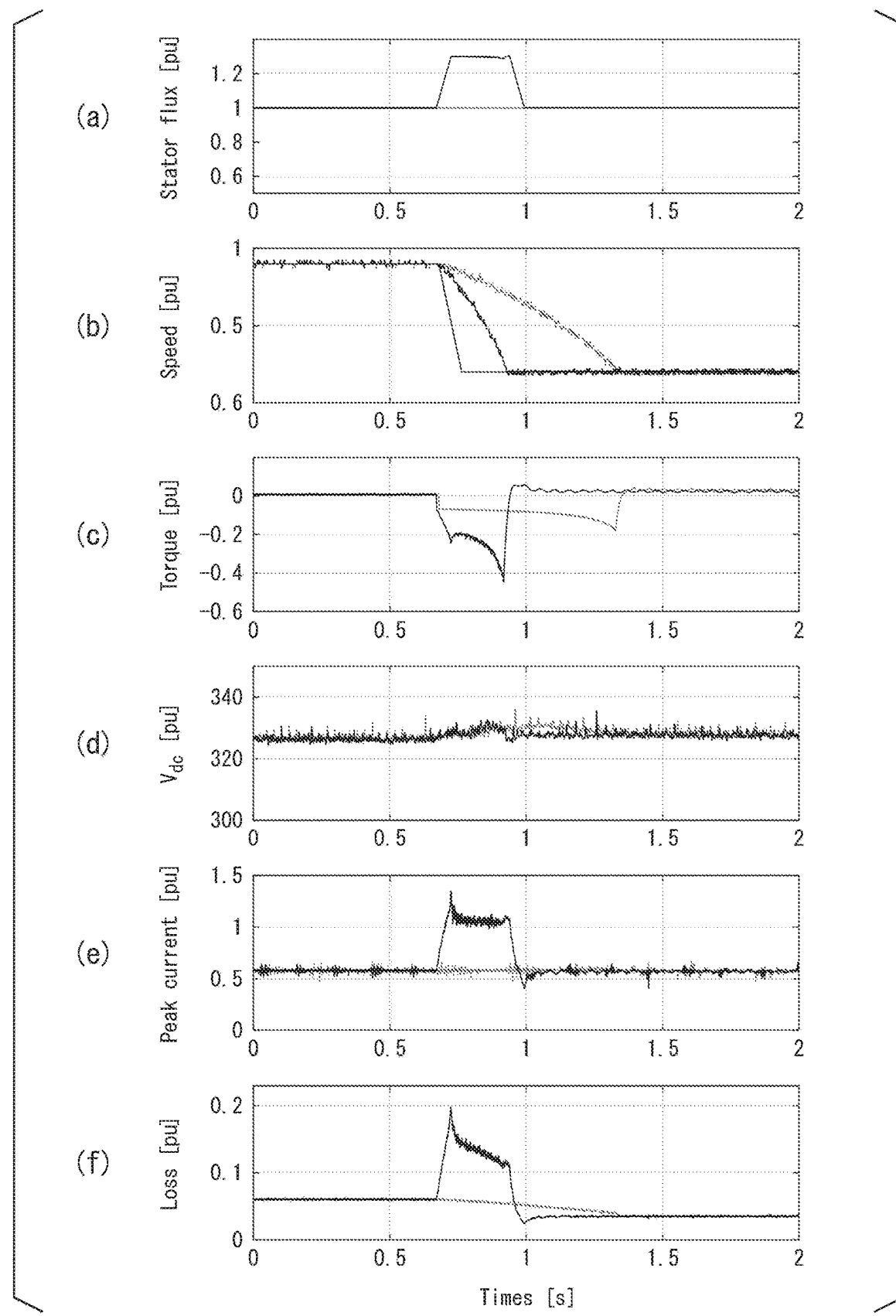
FIG. 8 is diagram illustrating a test result when a loss maximization technique according to the first embodiment is applied.

Next, a result of a test in which a loss maximization technique is applied to an actual induction motor will be described with reference to FIG. 8 is a diagram illustrating a test result when a loss maximization technique according to an embodiment is applied. In this test, by applying a developed loss maximization technique to a motor 2 of 3.7 kW (kilowatts), braking characteristics of the motor 2 are evaluated. As a comparative example, a case in which control is performed using rated magnetic flux will be described as an example Hereinafter, braking characteristics of the both cases will be compared and described.

A horizontal axis of each timing diagram illustrated in FIG. 8 represents the elapse of time in units of seconds. Each timing diagram illustrated in FIG. 8 will be described in order from the top in FIG. 8. The magnitude of a stator magnetic flux command λs_com is represented in (a) of FIG. 8. The magnitude of a rotor speed car is represented in (b) of FIG. 8. The magnitude of a torque Tem is represented in (c) of FIG. 8. A voltage of a DC voltage Vdc is represented in (d) of FIG. 8. The magnitude of a current feedback value Is_FBK is represented in (e) of FIG. 8. The current feedback value Is_FBK, for example, is calculated on the basis of a current detection value Is_det. The magnitude of a loss Ploss is represented in (f) of FIG. 8. In each timing diagram, a result (a black line) of a case in which a control method of maximizing a stator magnetic flux command λs_com such that a loss Ploss is applied according to this embodiment and a result (a grey line) of a case in which a control method of setting a stator magnetic flux λs to a rated value is applied as a comparative example are compared with each other and illustrated. The result of this comparison test is an example of a case in which the rotor speed ωr of the motor 2, for example, is decelerated from 0.9 [pu] to 0.2 [pu].

In an initial state, the rotor speed ωr of the motor 2 is within the range of the braking area I. The stator magnetic flux λs_com has a value of the initial state being 1 [pu], and the value of the torque Tem is 0 [pu].

At the time point of a time t1 (for example, 0.7 seconds), the value of the rotor angular velocity command ωr_com decreases, and the braking of the motor 2 starts. Thereafter, until a time t2, the stator magnetic flux λs_com monotonously increases from the value of the initial state.

In a period from the time t2 to a time t3, the braking continues, and the rotor speed ωr gradually decreases until it reaches the range of the braking area II. At this time, the magnitude of the stator magnetic flux command λs_com is adjusted such that the current does not exceed its limit value Ismax and is controlled to its upper limit value.

During this braking period, the loss Ploss and the braking torque Te_braking become maximums. As a result of the comparison illustrated in FIG. 8, it can be clearly seen that the braking time according to the embodiment is shorter than the braking time of the comparative example by about 60%.

In order to exclude a sharp change in the stator magnetic flux λs and a large current change occurring as a result thereof, it should be noted that a fifth block 21*e* is added as a filter having a bandwidth of a rotor time constant T to the stator magnetic flux command λs_com. The inertia of the motor 2 used for the test is relatively low, and, in accordance with this, a braking time becomes relatively short. When the stator magnetic flux command λs_com increases to a request value of a braking area I, the velocity becomes in a braking area II.

The following should be noted. As illustrated in (d) of FIG. 8, a DC voltage Vdc during braking may slightly increase. This phenomenon may occur in a case in which the accuracy of approximation of values of variables used for the analysis of a loss Ploss is relatively low. For this reason, the input power of the motor 2 may be set to be slightly negative by setting a braking force of the motor 2 to be slightly higher than the loss of the motor 2.

According to this embodiment described above, the control device 10 includes a plurality of calculation criteria for a stator magnetic flux estimated value of the motor 2. In a case in which the motor 2 is to be braked, by selecting a calculation criterion, which further increases the loss of the motor 2, for the stator magnetic flux estimated value from among the plurality of calculation criteria on the basis of at least the stator angular velocity ωr of the motor 2, the control device 10 can brake the motor 2 more stably.

Second Embodiment

A motor drive system 1A according to the second embodiment will be described.

In the embodiment described above, a case in which a DB-DTFC system is used for generating a voltage command value Vs_com has been described. Instead of this, in second and third embodiments, a case in which a field oriented control system is used will be described. Hereinafter, a magnetic field direction control system will be referred to as an FOC system. The FOC system is a system that independently controls each current component as a DC amount by decomposing a current component generating a torque (rotation force) and a current component generating magnetic flux from each other.

Figure 9:
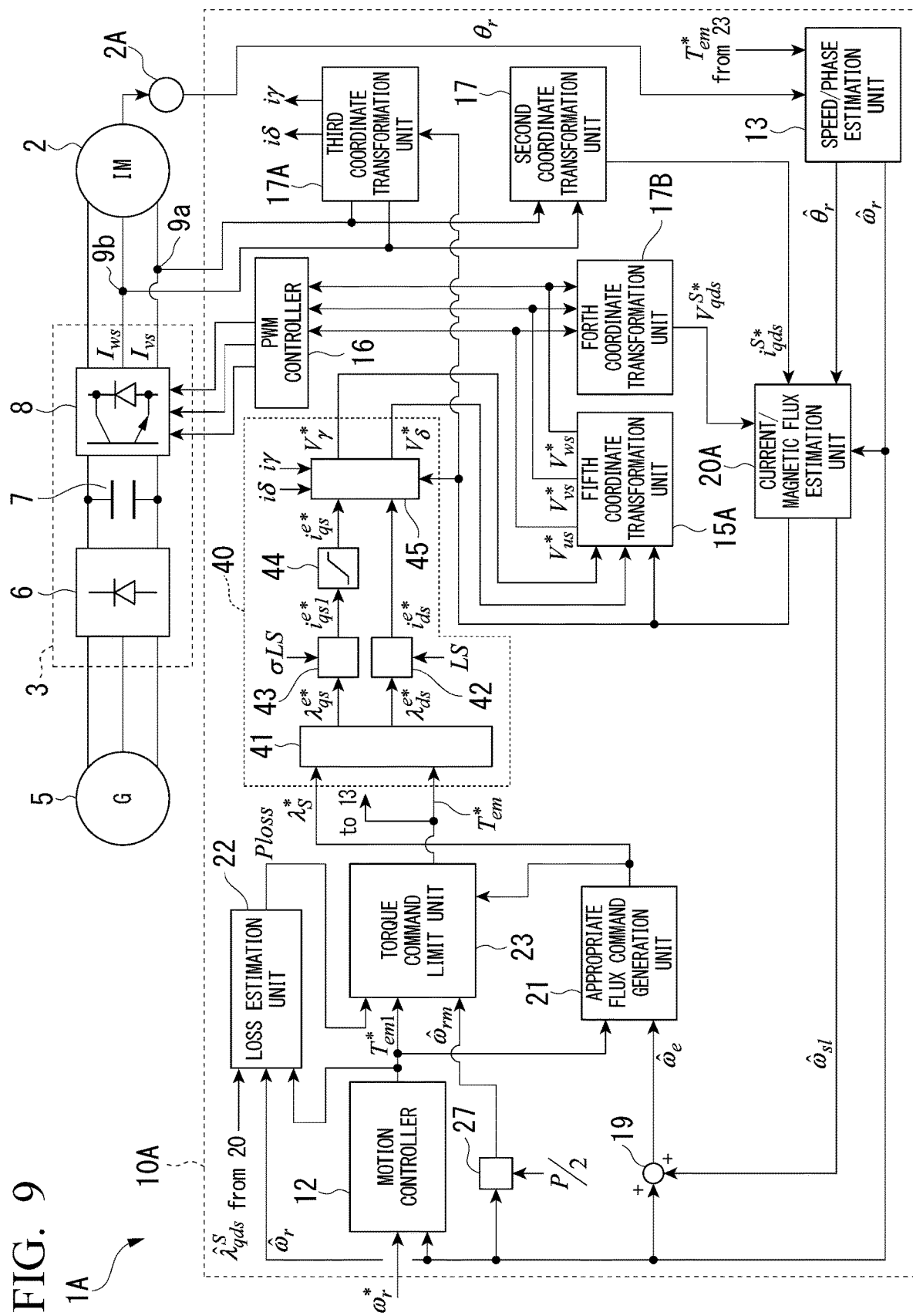
FIG. 9 is a block diagram of a motor drive system according to a second embodiment.

FIG. 9 is a block diagram of the motor drive system 1A according to an embodiment. The motor drive system 1A illustrated in FIG. 9 includes a control device 10A based on the FOC system instead of the control device 10 of the motor drive system 1 described above.

As the FOC system, there are an indirect field oriented control (IFOC) system and a direct field oriented control (DFOC) system. The IFOC system uses indirect vector control (also referred to as slip frequency-type vector control) controlling slip of an induction motor without estimation or detection of magnetic flux. The DFOC system uses direct vector control controlling slip of the motor 2 on the basis of a result of estimation or detection of magnetic flux. In this embodiment, an example of the latter DFOC system will be described, and an example of the former IFOC system will be described in the third embodiment.

In the control device 10A illustrated in FIG. 9, an FOC calculation unit 40 is disposed in place of the DB-DTFC calculation unit 14, a fifth coordinate transformation unit 15A is disposed in place of the first coordinate transformation unit 15, the slip frequency estimation unit 18 is omitted, and a current/magnetic flux estimation unit 20A is disposed in place of the current/magnetic flux estimation unit 20. The control device 10A is an example in which the latter DFOC system is applied.

The control device 10A includes a third coordinate transformation unit 17A and a fourth coordinate transformation unit 17B. A v-phase stator current Ivs and a w-phase stator current Iws are supplied to the third coordinate transformation unit 17A. Three-phase stator voltage command values Vus_com, Vvs_com, and Vws_com that are outputs of the fifth coordinate transformation unit 15A are supplied to the fourth coordinate transformation unit 17B.

A torque command value Tem_com is supplied from the torque command limit unit 23 to the FOC calculation unit 40. A stator magnetic flux command value λs_com of rated stator magnetic flux is supplied as a magnetic flux command from the appropriate flux command generation unit 21 to the FOC calculation unit 40.

The current/magnetic flux estimation unit 20A includes a magnetic flux observer (not illustrated in the drawings) including a physical model that is similar to that of the current/magnetic flux estimation unit 20. The current/magnetic flux estimation unit 20A calculates a reference signal θe_com and a slip angle frequency estimated value ωs1_est relating to the slip of the motor 2 using a stator qds-axis magnetic flux estimated value λqds_s_est and the like calculated by the magnetic flux observer and outputs the reference signal and the slip angle frequency estimated value that have been calculated.

The third coordinate transformation unit 17A transforms an input signal into signals of a γ component and a δ_component of a rotary coordinate system that are orthogonal to each other on the basis of a reference signal θe_com supplied from the current/magnetic flux estimation unit 20A. By appropriately selecting a phase of the reference signal θe_com, the third coordinate transformation unit 17A can set the reference signal θe_com as a reference phase, set a component having the same phase as the reference phase as a γ component, and set a component orthogonal to the reference phase as a δ_component. The third coordinate transformation unit 17A supplies a γ-axis stator current iγ and a δ-axis stator current iδ of which coordinates have been transformed to the FOC calculation unit 40.

Oppositely to the above, the fifth coordinate transformation unit 15A transforms a voltage command value Vγ_com of the γ component and a voltage command value Vδ_com of the δ component that are outputs from the FOC calculation unit 40 into three-phase stator voltage command values Vus_com, Vvs_com, and Vws_com of the stator coordinate system using the reference signal θe_com supplied from the current/magnetic flux estimation unit 20A. The result of the calculation executed by the fifth coordinate transformation unit 15A is supplied to the PWM controller 16 and the fourth coordinate transformation unit 17B.

The fourth coordinate transformation unit 17B transforms the three-phase stator voltage command values Vus_com, Vvs_com, and Vws_com into a voltage command value Vqds_s_com of a two-axis component of the qds axis. The value transformed by the fourth coordinate transformation unit 17B is supplied to the current/magnetic flux estimation unit 20.

The FOC calculation unit 40 generates a stator current command value iγ_com of the γ component and a stator current command value Iδ_com of the δ component on the basis of the supplied signals therein. The FOC calculation unit 40 generates a stator voltage command value Vγ_com and a stator voltage command value Vδ_com such that the γ-axis stator current iγ and the δ-axis stator current iδ follow the command values. The voltage command value Vγ_com of the γ component and the voltage command value Vδ_com of the δ component are supplied from the FOC calculation unit 40 to the fifth coordinate transformation unit 15A and are given to the power conversion device 3 further through the PWM controller 16 as a gate pulse GP.

Hereinafter, an example of the FOC calculation unit 40 will be described. For example, the FOC calculation unit 40 includes calculation blocks 41 to 44 and a current regulator 45.

The calculation block 41 calculates and outputs a solution satisfying the following Equation (15) or a synchronous qds-axis magnetic flux command value λqds_e_com based on Equation (15).

$$T_{em}^{*} = \frac{3}{2}\frac{P}{2}\frac{Lm^2}{\sigma Ls^2 Lr}\lambda_{qs}^{e*}\lambda_{ds}^{e*} \tag{15}$$

Figure 10:
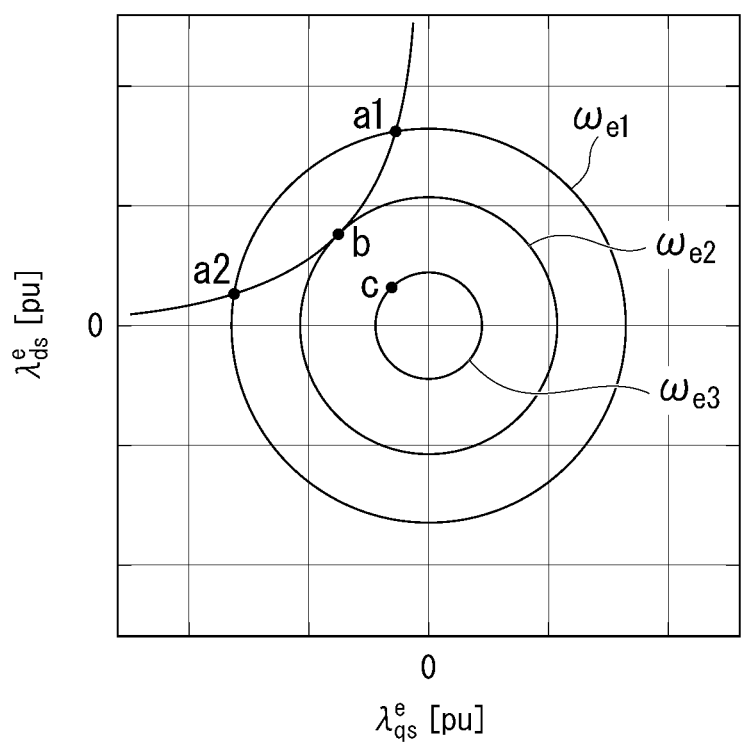
FIG. 10 is a diagram illustrating a calculation process according to the second embodiment.

Equation (15) represented above can be schematically illustrated as FIG. 10. FIG. 10 is a diagram illustrating a calculation process according to the embodiment.

A scalar value of the synchronous qds-axis magnetic flux command value λqds_e_com is illustrated by a circle having the origin of the coordinate axes of the synchronous qds-axis coordinate system as its center. A radius of the circle is the magnitude of the synchronous qds-axis magnetic flux command value λqds_e_com.

The air gap torque command value Tem_com becomes a hyperbola in the synchronous qds coordinate system. An intersection between the circle of the synchronous qds-axis magnetic flux command value λqds_e_com and the hyperbola of the air gap torque command value Tem_com (for example, a point a1, a point a2, or a point b) becomes a synchronous qds-axis magnetic flux command value λqds_e_com that can satisfy the air gap torque command value Tem_com, and this becomes a solution of Equation (15) described above.

Depending on conditions, there are cases in which there is no intersection between the circle of the synchronous qds-axis magnetic flux command value λqds_e_com and the hyperbola of the air gap torque command value Tem_com. In such cases, although the synchronous qds-axis magnetic flux command value λqds_e_com that can satisfy the air gap torque command value Tem_com cannot be acquired, conditions represented by the point c may be selected as a best solution. In such a case, the point c becomes a point at which a distance from the circle of the synchronous qds-axis magnetic flux command value λqds_e_com to the hyperbola of the air gap torque command value Tem_com is the shortest with respect to points on the circumference of the circle of the synchronous qds-axis magnetic flux command value λqds_e_com.

The calculation block 42 divides the synchronous ds-axis magnetic flux command value λds_e_com that is a synchronous ds-axis component of synchronous qds-axis coordinates calculated by the calculation block 41 by "Ls" and outputs a synchronous ds-axis current command value ids_e_com.

The calculation block 43 divides the synchronous qs-axis magnetic flux command value λqs_e_com that is a synchronous qs-axis component of synchronous qds-axis coordinates calculated by the calculation block 41 by "σLs" and outputs a synchronous qs-axis current command value iqs1_e_com. The calculation block 44 is a limiter that limits the synchronous qs-axis current command value iqs1_e_com such that it falls within a predetermined amplitude range. The calculation block 44 transmissively outputs a synchronous qs-axis current command value iqs_e_com having the same value as the value of the synchronous qs-axis current command value iqs1_e_com in a case in which the synchronous qs-axis current command value iqs1_e_com enters the predetermined amplitude range and outputs a synchronous qs-axis current command value iqs_e_com having a limit value set in advance in a case in which the synchronous qs-axis current command value iqs1_e_com exceeds the predetermined amplitude range.

The current regulator 45 generates a synchronous ds-axis current command value ids_e_com and a synchronous qs-axis current command value iqs_e_com on the basis of the reference signal θe_com. For example, the current regulator 45 adjusts the voltage command value Vγ_com of the γ component and the voltage command value Vδ_com of the δ component on the basis of a set of the synchronous ds-axis current command value ids_e_com and the synchronous qs-axis current command value iqs_e_com, and a set of the γ-axis stator current iγ and the δ-axis stator current iδ such that the γ-axis stator current iγ and the δ-axis stator current iδ respectively become the same as the synchronous ds-axis current command value ids_e_com and the synchronous qs-axis current command value iqs_e_com, and outputs the adjusted voltage command values. As described above, the voltage command value Vγ_com of the γ component and the voltage command value Vδ coin of the δ component become outputs of the FOC calculation unit 40.

The control device 10A according to this embodiment controls the motor 2 using the FOC calculation unit 40 and the current/magnetic flux estimation unit 20A in accordance with the DFOC system. A generally-known configuration of the FOC may be applied to the FOC calculation unit 40 instead of the configuration described above.

Third Embodiment

A motor drive system 1B according to the third embodiment will be described.

Figure 11:
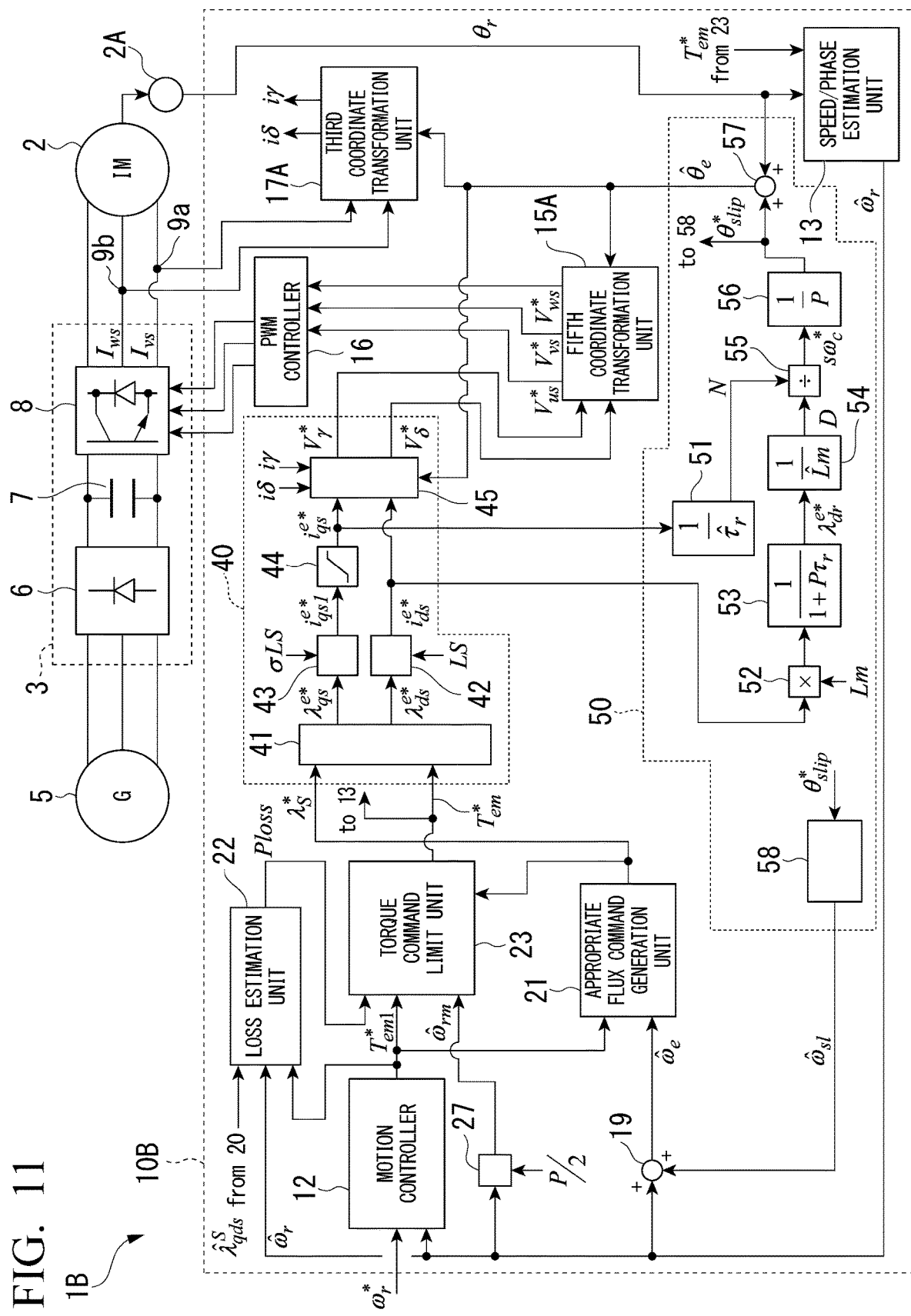
FIG. 11 is a block diagram of a motor drive system according to a third embodiment.

FIG. 11 is a block diagram of the motor drive system 1B according to the embodiment. The motor drive system 1B illustrated in FIG. 11 includes a control device 10B based on the IFOC system instead of the control device 10A of the motor drive system 1A based on the DFOC system.

In the control device 10B, a synchronous processing unit 50 is disposed instead although the second coordinate transformation unit 17 and the fourth coordinate transformation unit 17B, and the current/magnetic flux estimation unit 20 of the control device 10A are omitted.

The synchronous processing unit 50, for example, includes calculation blocks 51 to 58.

The calculation block 51 divides an amplitude value of a synchronous qs-axis current command value iqs_e_com output from a calculation block 44 by a rotor time constant estimated value τr_est and outputs the calculation result N. The calculation block 52 multiplies an amplitude value of a synchronous qs-axis current command value iqs1_e_com output from a calculation block 43 by "Lm" and outputs a product thereof. The calculation block 53 divides the product output from the calculation block 52 by "(1+Pτr)" and outputs the result thereof as a synchronous dr-axis magnetic flux command value λdr_e_com of a synchronous qr-axis component of synchronous qdr-axis coordinates. The calculation block 54 divides the synchronous dr-axis magnetic flux command value λdr_e_com output from the calculation block 53 by an estimated value of "Lm" and outputs the calculation result D. The calculation block 55 divides the calculation result D of the calculation block 54 by the calculation result N of the calculation block 51 and outputs the calculation result as a slip angle phase command value θslip_com. The calculation block 56 divides the slip angle phase command value θslip_com output from the calculation block 55 by the number P of poles and outputs the calculation result as a slip phase θslip_com. The calculation block 57 is an adder and adds the slip phase θslip_com output from the calculation block 56 and a phase θr output by a sensor 2A and outputs the calculation result as the reference signal θe_est. The calculation block 57 supplies the reference signal θe_est that is the calculation result to the FOC calculation unit 40, a third coordinate transformation unit 17A, and a fifth coordinate transformation unit 15A. The calculation block 58 differentiates the slip angle phase command value θslip_com output from the calculation block 56 and outputs the calculation result as a slip angle frequency estimated value ωs1_est.

The control device 10B according to this embodiment controls the motor 2 based on the IFOC system using the FOC calculation unit 40 and the synchronous processing unit 50.

(Control Device According to Embodiment)

Figure 12:
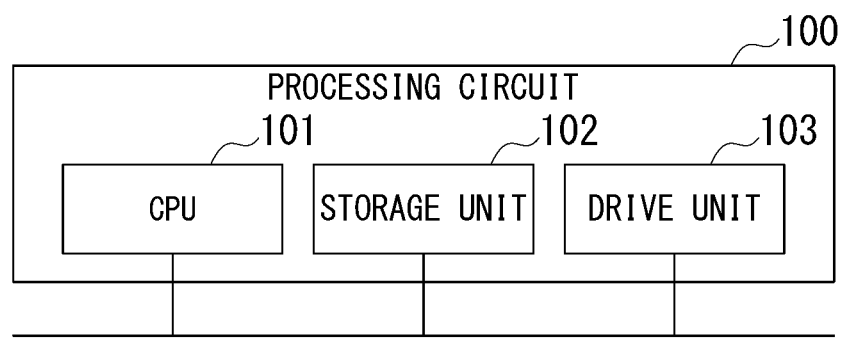
FIG. 12 is a block diagram of a control device according to the embodiment described above.

The control device 10 according to the embodiment will be described. FIG. 12 is a block diagram of the control device 10 according to the embodiment. The control device 10 includes a processing circuit 100. The processing circuit 100 illustrated in FIG. 12 includes a CPU 101, a storage unit 102, and a drive unit 103. The CPU 101, the storage unit 102, and the drive unit 103 are connected through a bus. The processing circuit 100 is an example of the control device 10. The CPU 101 includes a processor that executes a desired process in accordance with a software program. The storage unit 102 includes a semiconductor memory. The drive unit 103 generates a control signal of the power conversion device 3 in accordance with the control of the CPU 101. In the embodiment, processes executed by the CPU 101 and the drive unit 103 will be simply described together as processes of the control device 10. For example, the control device 10 controls the power conversion device 3 on the basis of detection results acquired by the current detectors 9a and 9b and the like.

The control device 10A and the control device 10B are similar to the control device 10.

According to at least one of the embodiments described above, the motor drive system 1 includes the power conversion device 3 and the control device 10. The power conversion device 3 causes a current to flow through a winding of the motor 2. The control device 10 drives the motor 2 by controlling the power conversion device 3 through vector control. The control device 10 includes a plurality of calculation criteria for the stator magnetic flux estimated value of the motor 2 and selects a calculation criterion for the stator magnetic flux estimated value for increasing the loss of the motor 2 more from among the plurality of calculation criteria on the basis of at least the rotation speed of the motor 2 in the case of braking the motor 2. In accordance with this, the motor drive system 1 can brake the motor 2 more stably.

While certain embodiments have been described, these embodiments have been presented by way of example only, and are not intended to limit the scope of the disclosures. Indeed, the novel embodiments described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

EXPLANATION OF REFERENCES 1, 1A, 1B Motor drive system
2 Motor
3 Power conversion device
9a, 9b Current detector
10, 10A, 10B Control device
12 Motion controller
13 Speed/phase estimation unit
14 DB-DTFC calculation unit
15 First coordinate transformation unit
15A Fifth coordinate transformation unit
16 PWM controller
17 Second coordinate transformation unit
17A Third coordinate transformation unit
17B Fourth coordinate transformation unit
18 Slip angle frequency estimation unit
19 Adder unit 20, 20A Current/magnetic flux estimation unit
40 FOC calculation unit

What is claimed is:

1. A motor drive system, comprising:
an inverter that causes a current to flow through a winding of an induction motor; and
a control device that drives the induction motor by controlling the inverter through vector control that further increases a loss of the induction motor using a stator magnetic flux estimated value and a stator magnetic flux command value of the induction motor in a case of braking the induction motor,
wherein the control device includes circuitry configured to select one of stator magnetic flux command values each related to a plurality of calculation criteria which include a calculation criterion using a limit value of an AC voltage output from the inverter and a rotation speed of the induction motor.

2. The motor drive system according to claim 1, wherein the circuitry is further configured to select the calculation criterion for the stator magnetic flux command value on the basis of a logical value that is defined on the basis of a voltage output by the inverter, a current flowing from the inverter to the winding of the induction motor, and a rotation speed of the induction motor.

3. The motor drive system according to claim 1, wherein the circuitry is further configured to select the calculation criterion for the stator magnetic flux command value by using whether or not an oval representing a maximum current of the current flowing through the winding of the induction motor is included inside a circle of a maximum voltage of a voltage relating to the winding of the induction motor on a stator magnetic flux coordinate plane.

4. The motor drive system according to claim 1, wherein the circuitry is further configured to determine a magnitude of a stator magnetic flux command value on the basis of an operating point determined on the basis of a maximum current of a current flowing through the winding of the induction motor and a torque command value on a stator magnetic flux coordinate plane in a case in which a rotation speed of the induction motor is relatively low.

5. The motor drive system according to claim 4, wherein the circuitry is further configured to set the magnitude of the stator magnetic flux command value relating to the operating point determined on the basis of the maximum current of the current flowing through the winding of the induction motor and the torque command value on the stator magnetic flux coordinate plane to be smaller than a magnitude of a stator magnetic flux command value relating to an operating point determined on the basis of a maximum voltage applied to the winding of the induction motor in a case in which the rotation speed of the induction motor is relatively low.

6. The motor drive system according to claim 1, wherein the circuitry is further configured to set an operating point determined on the basis of a maximum voltage of a voltage relating to the winding of the induction motor and a torque command value on a stator magnetic flux coordinate plane to be disposed inside an oval defining a maximum current of the current flowing through the winding of the induction motor in a case in which the rotation speed of the induction motor is relatively high.

7. The motor drive system according to claim 1, wherein the circuitry is further configured to limit a command value of an air gap torque of the induction motor to a value determined on the basis of a loss of the induction motor and the rotation speed of the induction motor.

8. A control method of a motor drive system including:
an inverter that causes a current to flow through a winding of an induction motor; and
a control device that drives the induction motor by controlling the inverter through vector control that further increases a loss of the induction motor using a stator magnetic flux estimated value and a stator magnetic flux command value of the induction motor in a case of braking the induction motor,
the control method comprising:
selecting one of stator magnetic flux command values each related to a plurality of calculation criteria which include a calculation criterion using a limit value of an AC voltage output from the inverter and a rotation speed of the induction motor.

9. The motor drive system according to claim 3, wherein the stator magnetic flux coordinate plane has an origin and orthogonal coordinate axes aligned with a direction of a voltage vector relating to phases of the stator, and includes the circle and the oval overlapped.

10. The motor drive system according to claim 4, wherein the stator magnetic flux coordinate plane has an origin and orthogonal coordinate axes aligned with a direction of a voltage vector relating to phases of the stator.

11. The motor drive system according to claim 6, wherein the stator magnetic flux coordinate plane has an origin and orthogonal coordinate axes aligned with a direction of a voltage vector relating to phases of the stator, and includes the circle and the oval overlapped.

* * * * *